No. 837,539. PATENTED DEC. 4, 1906.
E. BIPPART.
DOUBLE PLOW.
APPLICATION FILED APR. 16, 1906.
3 SHEETS—SHEET 2.
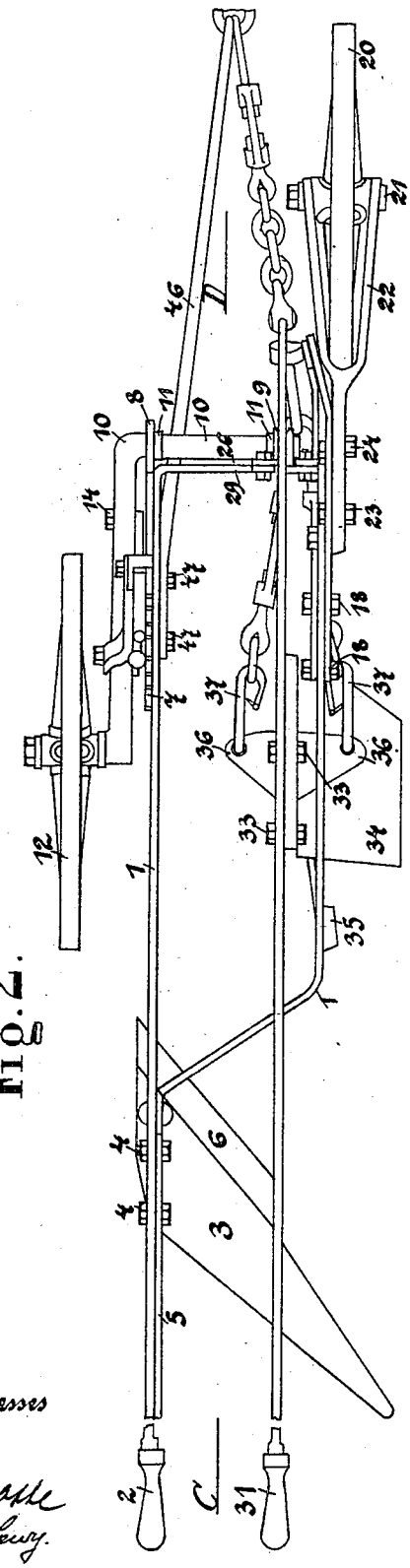
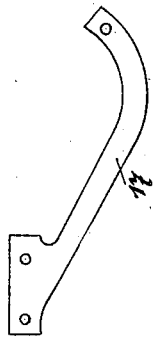
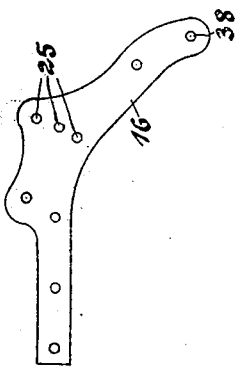
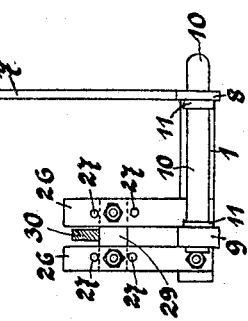
Witnesses
Carl Ahle
Max Levy.
Inventor
Ernst
Bippart

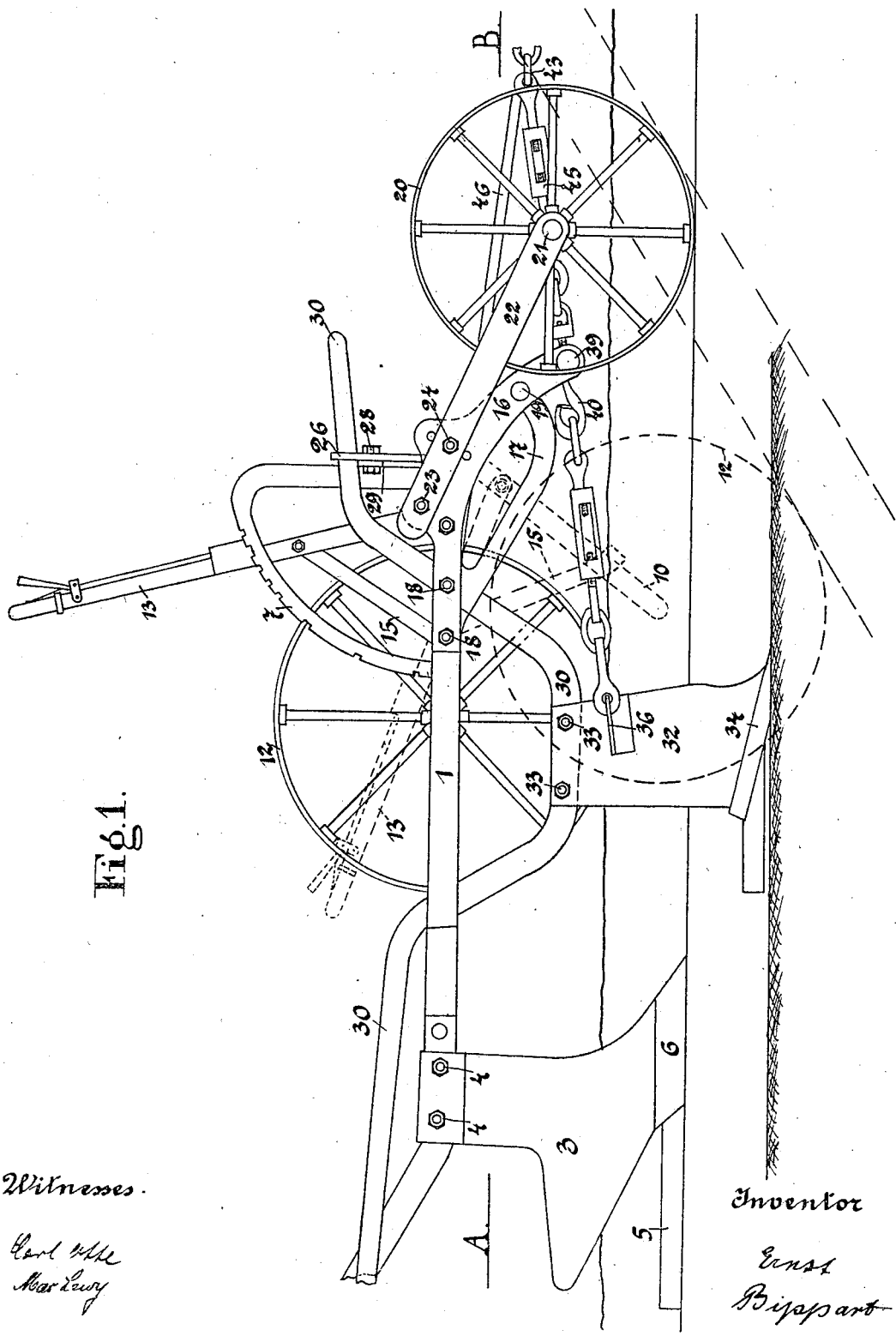

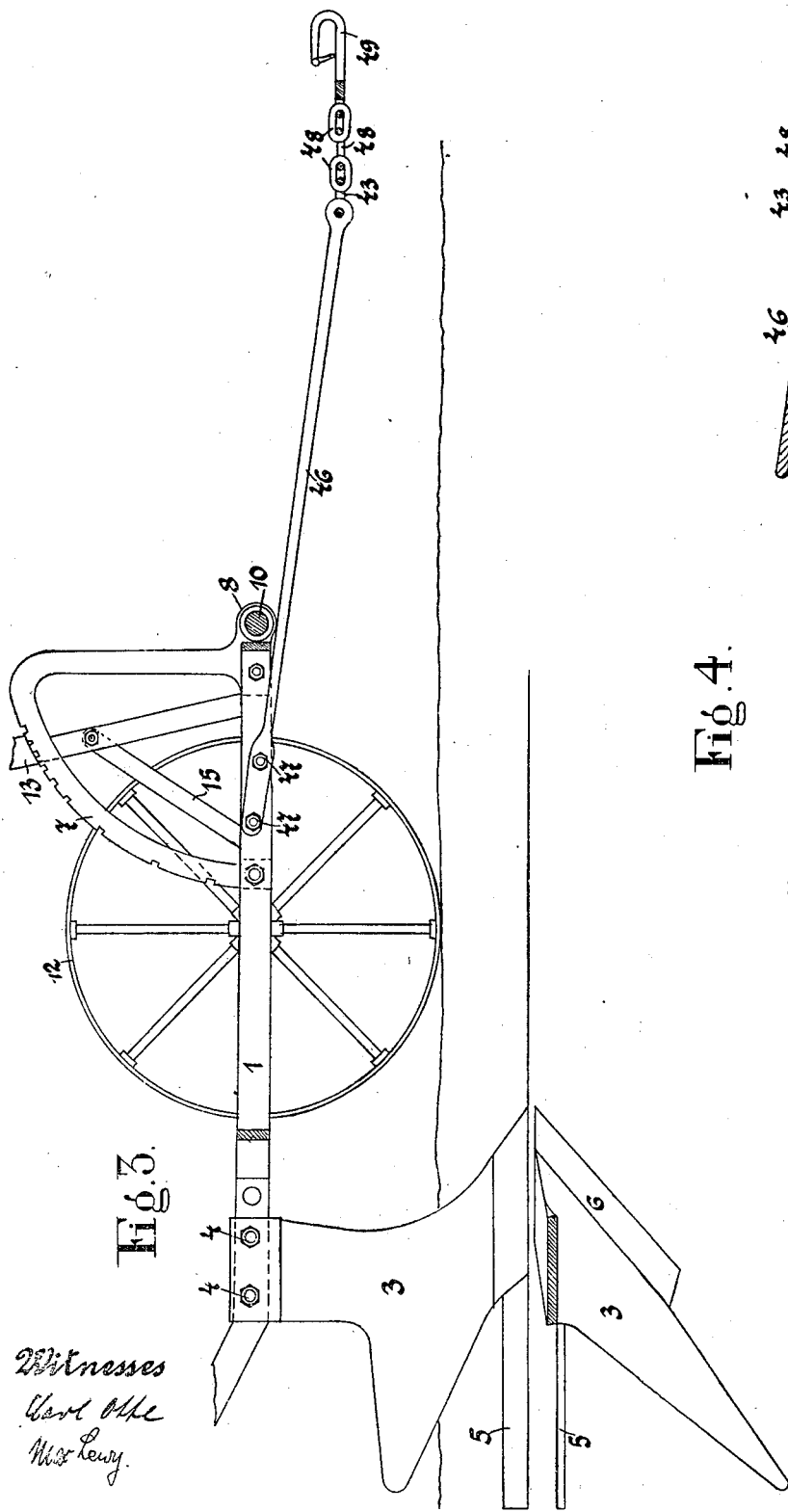
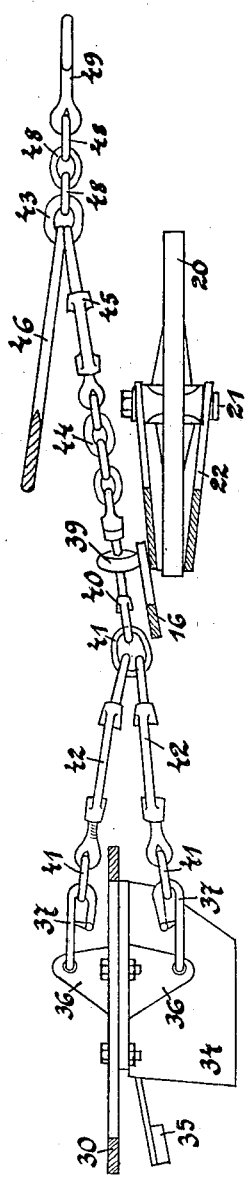

UNITED STATES PATENT OFFICE.

ERNST BIPPART, OF ARNSTADT, THURINGIA, GERMANY.

DOUBLE PLOW.

No. 837,539.   Specification of Letters Patent.   Patented Dec. 4, 1906.

Application filed April 16, 1906. Serial No. 311,970.

*To all whom it may concern:*

Be it known that I, ERNST BIPPART, a citizen of the Empire of Germany, residing at Arnstadt, in Thuringia, in the Empire of Germany, have invented a new and useful Double Plow, of which the following is a specification.

There are known double plows in which each plow is secured on a special adjustable beam and the two adjustable beams are connected one with another only by means of the axle of the front barrow with the aid of adjustable supports and adjustable chains.

My invention relates to an improved double plow which differs from the above-mentioned double plows in that the one plow is rigidly connected with a frame supported by two wheels and that the other plow is attached to an adjustable rocking beam whose front part is supported by an adjustable support, while the plow itself is connected with the frame by means of adjustable chains in a similar manner as in the said known double plows. By this arrangement not only the two plows are rendered independent of each other, but also the transport of the double plow is much facilitated, since the double plow can run on its own wheels, and, by the by, also the turning of the double plow on the ground is facilitated.

I will now proceed to describe my invention with reference to the accompanying drawings, in which—

Figure 1 is an elevation of a double plow in working order. Fig. 2 is a plan of the same. Fig. 3 is a vertical longitudinal section through the same on the line C D in Fig. 2. Fig. 4 is a horizontal section through the same on the line A B in Fig. 1. Fig. 5 is a front view of the frame alone in combination with the adjustable support, a cranked shaft for the left wheel, and a segment-rack; and Figs. 6 and 7 are details, which will be referred to later on.

Similar characters of reference refer to similar parts throughout the several views.

A known frame 1 of the shape shown at Fig. 2 is made from flat iron or steel by bending it four times and may be lengthened rearward to form a left handle 2. On the left portion of this frame 1 an ordinary plow 3 is fastened by means of bolts 4 4 and nuts, and the plow 3 may be provided with a share 6 and a horizontal guiding-bar 5. A segment-rack 7, provided with a convenient number of notches, is fastened on the left portion of the frame 1 by means of bolts and screws (see Fig. 3) and may be made in one piece with an eye 8. In this eye 8 and in a suitable bearing 9, fastened on the front of the frame 1, a cranked axle 10 is mounted to rock, which is preferably prevented from longitudinally shifting by means of suitable collars 11 11.

On the free end of the arm of the cranked axle 10 a wheel 12 of any known construction is mounted to turn. An adjusting-lever 13 of a construction similar to that of known steering-levers in steam-engines and the like is rigidly connected with the arm of the cranked axle 10 in any known manner—for example, by means of a bolt 14 and nut, Fig. 2, and of a suitable strut 15. This adjusting-lever 13 can engage in any of the notches of the segment-rack 7.

On the right portion of the frame 1 an arm 16 and a strut 17 of the shapes clearly shown at Figs. 6 and 7 are fastened without and within, respectively, by means of bolts 18 18. The arm 16 and the strut 17 are united by a bolt 19 or the like. A furrow-wheel 20 is mounted to turn on a spindle 21, which is fastened in the ends of a fork 22. The upper end of the fork 22 is fastened in either of three positions on the arm 16 by means of two bolts 23 and 24, of which the lower bolt 24 can engage in either of three holes 25 25. It will be seen that the two wheels 12 and 20 will occupy their relative position for the position shown of the adjusting-lever 13. If, however, the latter is depressed and brought into the lowermost position, (indicated by dotted lines in Fig. 1,) the left wheel 12 would assume a position indicated by the dotted circle if the soil were not there. Now that the soil supports the left wheel 12 the consequence of the said motion of the adjusting-lever 13 will be that the frame 1, with all the parts attached thereto, will be raised and inclined, as will be seen from Fig. 1, when bearing in mind that the two straight dotted lines now represent the ground-line and the furrow-line, respectively.

To the front of the frame 1 two studs 26 26 are fastened by means of bolts and nuts or the like. They are each provided with several holes 27 27, into which a bolt 28 can engage. A horizontal support 29 can be adjusted on the two studs 26 26 by means of the bolts 28 28 and serves for supporting the front part of a cranked beam 30, which can be inserted in the frame 1 from above and may be at its rear end formed to a right handle 31. A subsoil-plow 32 of any known construction may be fastened on the lower middle part of the beam 30 by means of bolts 33 33 and may be provided with a slanting share 34 and with a horizontal inclined guiding-bar 35. Two lugs 36 36 are fastened on both sides of the plow 32 by means of rivets or bolts and are provided at their free ends with holes, in which two hooks 37 37 are mounted to rock in all directions. In the lower hole 38 of the arm 16, Fig. 6, a swivel 39, Fig. 4, is disposed, in which the shank of a hook 40 is longitudinally movable. This hook 40 may be connected with the two hooks 37 37 above mentioned by means of links 41 41 and adjustable turnbuckles 42 42. The front end of the hook 40 is connected with a link 43 by means of a short chain 44 and an adjustable turnbuckle 45. To the inside of the left portion of the frame 1 an inclined rod 46 may be attached by means of bolts 47 47 or the like, Fig. 3. The front end of the rod 46 is formed to an eye, in which the said link 43 engages. The link 43 is connected by a few links 48 48 with a draft-hook 49 of any known construction, to which the animal or animals can be put in any known manner.

It will be seen that the power of the animal or animals is transferred to the two plows 3 and 32 by means of the rod 46 and the chains described.

The double plow may be operated in any suitable manner obvious to any one versed in the art to which this invention belongs—for example, as follows: The implement may be transported on some carriage or the like to the field. On the place the fork 22 may be adjusted on the frame 1 by means of the bolt 24, the support 29 may be adjusted on the two studs 26 26 by means of the bolts 28 28, and the distance of the subsoil-plow 32 from the hook 40 may be adjusted in accordance with the desired depth of the furrows or in accordance with experience. The two wheels 12 and 20 being still on the level of the ground, the adjusting-lever 13 is brought into a convenient position, so that the left wheel 12 is at some height above the ground, while the point of the plow 3 may have a little cut into the ground. After putting the animal or animals to the implement the countryman raises the subsoil-plow 32 by its handle 31 on the right and grips the other handle 2 on the left while driving the animal or animals. The plow 3 will alone cut into the soil and form the first furrow of the desired depth, the adjusting-lever 13 being properly adjusted. After cutting the furrow in a direction or around the field and returning to the starting-point the right wheel 20 will drop and rest on the surface of the first furrow. Of course before cutting the first furrow the countryman may disconnect the beam 30, the subsoil-plow 32, and the parts 37, 41, 42, and 41 from the hook 40 and put these parts aside, if he so prefers. In this case it will be necessary to put in again these parts for cutting the two furrows at a time. The adjusting-lever 13 is again adjusted with regard to the altered position of the right wheel 20 and to the desired depth of the second furrow. Now the countryman driving the animal or animals grips the two handles 2 and 31 and depresses the right handle 31 until the subsoil-plow 32 has cut into the soil to the desired depth, so that its guiding-bar 35 will slide on the bottom of the second furrow and will prevent the plow 32 from sinking deeper. At this moment the countryman leaves hold of the right handle 31 and permits the subsoil-plow 32 to work freely and the beam 30 to vertically rock around the adjustable support 29, while he only continues to grip the left handle 2 for controlling the ordinary plow 3, as usual. Only when turning round a corner the countryman is required to grip and to manage the right handle 31 in addition to the left handle 2. It is necessary to permit the subsoil-plow 32 to work freely, as thereby it will be enabled to move over or beneath any stone that may be in the soil without being hurt. Thus the two plows 3 and 32 are rendered independent of each other during their work.

It is to be noted that by adjusting the lever 13 on the segment-rack 7 the two wheels 12 and 20 can be displaced with regard to each other for varying the depths of the two furrows to be cut. The adjusting-lever 13 may be depressed so much as to withdraw both plows 3 and 32 from the soil for avoiding any obstacle, if so required, or the two plows 3 and 32 may be raised so high above the level of the ground as to facilitate the transport of the implement to another place.

The double plow may be varied in many respects without deviating from the spirit of my invention.

What I claim as my invention, and desire to secure by Letters Patent, is—

1. In a double plow, the combination with a frame provided on the rear with a handle, of means for supporting said frame at a height above the ground, a plow rigidly fastened on the one side portion of said frame, an adjustable support on the front of said frame, a cranked beam adapted to rest with its front part on said adjustable support and to vertically rock around the same, while its rear end is provided with a handle, a second plow fastened on said cranked beam and provided with two lugs on both sides, a draft-hook, means connecting said draft-hook with said frame, and chains connecting said draft-hook with the two lugs of said second plow.

2. In a double plow, the combination with a frame provided on the rear with a handle, of a cross horizontal axle mounted in said frame to rock and provided on one side with an arm, a wheel mounted to turn on the free end of the arm of said cross horizontal axle and adapted to roll on the ground, a segment-rack on said frame, an adjusting-lever rigidly connected with the arm of said cranked axle and adapted to engage in either of the notches of said segment-rack, a fork adjustable on said frame on the side opposite to that of said wheel, a second wheel mounted on a pin in the free ends of said fork to turn and adapted to roll on the ground, two studs on the front of said frame, a cross-support vertically adjustable on said two studs, a cranked beam adapted to rest with its front part on said cross-support between said two studs and to vertically rock around the same, while its rear end is provided with a handle, a second plow fastened on said cranked beam and provided with two lugs on both sides, a draft-hook, means connecting said draft-hook with said frame, and adjustable chains connecting said draft-hook with the two lugs of said second plow.

In testimony whereof I have signed my name to this specification in the presence of two subscribing witnesses.

ERNST BIPPART.

Witnesses:
PAUL TEICHMANN,
ANNE B. SLOCUM.